United States Patent [19]

Tilton et al.

[11] Patent Number: 4,846,326
[45] Date of Patent: Jul. 11, 1989

[54] CARBON TO CARBON FRICTION CLUTCH

[76] Inventors: McLane Tilton, 25 Easy St., Box 1787, Buellton, Calif. 93427; John E. Lindo, 3 Shadow Mountain Dr., Buellton, Calif. 93427; Raymond A. Sorce, 120 North X St., Lompoc, Calif. 93427

[21] Appl. No.: 126,171

[22] Filed: Nov. 27, 1987

[51] Int. Cl.⁴ ............................................. F16D 13/56
[52] U.S. Cl. .................................. 192/70.19; 192/70.2; 192/107 M
[58] Field of Search ................. 192/70.19, 70.2, 70.27, 192/70.14, 107 M, 70.16

[56] References Cited

U.S. PATENT DOCUMENTS

| | | | |
|---|---|---|---|
| 1,344,399 | 1/1920 | Holt | 192/70.2 X |
| 1,554,394 | 9/1925 | White | 192/70.19 |
| 1,855,937 | 4/1932 | Callsen | 192/70.27 X |
| 2,016,305 | 10/1935 | Wales | 192/70.19 X |
| 3,552,533 | 1/1971 | Nitz et al. | 192/107 M |
| 3,759,353 | 9/1973 | Marin | 188/71.5 |
| 3,791,499 | 2/1974 | Ryan | 192/70.27 |
| 3,932,568 | 1/1976 | Watts et al. | 192/107 M X |
| 4,225,025 | 9/1980 | Crawford | 192/70.2 |

FOREIGN PATENT DOCUMENTS 2149317 4/1973 Fed. Rep. of Germany ..... 192/70.2

Primary Examiner—Rodney H. Bonck
Attorney, Agent, or Firm—Gilbert Kivenson

[57] ABSTRACT

A friction clutch in which carbon input disks are coupled to a flywheel by radial slots in their peripheries. Carbon input disks are coupled to a drive shaft by means of inner, radial slots and a metallic hub which contains slot-matching fingers. The input and output disks as well as the hub are axially free standing when the clutch is disengaged. The design distributes load more uniformly over the carbon plates than previous devices and allows greater service life of the clutch.

1 Claim, 2 Drawing Sheets

CARBON TO CARBON FRICTION CLUTCH

BACKGROUND AND OBJECTIVES

This invention relates to improvements in carbon to carbon friction clutches.

These mechanisms employ carbon disks for both the driver and the driven plates; the disks are free standing, i.e. the carbon is not applied as a facing material for steel disks. Carbon in this application has two major advantages: its coefficient of friction increases with temperature—a desirable property when the clutch is engaged and disengaged repeatedly in short periods of time; it has a density which is half of that of steel—light weight clutches can easily be designed with the use of carbon.

Carbon also has two disadvantages: it has a relatively low compressional strength and it abrades easily. In recent years methods have been devised for improving carbon's physical properties. In one process (Watts et al., U.S. Pat. No. 3,932,568) carbon particles are heated, mixed with phenolic resin and molded into plates under heat and pressure. Another process (Nitz, U.S. Pat. No. 3,552,533) involves the adding of carbon reinforcing fibers to a carbon matrix and hot pressing the latter in a mold. These and other processes have made it possible to design a clutch which uses free standing disks of carbon. This kind of unit is described by Marin, U.S. Pat. No. 3,759,353. A carbon to carbon clutch of this type will operate satisfactorily at low and moderate loads. A carbon driven plate which depends on carbon teeth to mesh with steel splines in an output shaft would fail in shear as the load became high, even with the improved carbon material. In racing cars loads are very high as the driver accelerates and decelerates during various maneuvers. A carbon to carbon clutch made in accordance with the prior art would therefore have a limited life.

If a suitable means were available for reinforcing the driven plates against compressional failure, the second disadvantage—high abrasion rate can also be minimized. The driving and driven plates can be arranged so that they "float" during clutch disengagement. This allows both sets of plates to "rearrange" themselves axially prior to each re-engagement, a situation which minimizes abrasive wear. It is also possible in a carbon to carbon clutch to use less steel in the overall construction, substituting lighter metals, with the net result of increased maneuverability during racing.

It is one objective of the present invention to reinforce the driven carbon plate so that it can withstand high compression loading.

It is a second objective to incorporate an axial "floating" action in the clutch so that a uniform and low wear rate is achieved and the effects of initial axial misalignment are minimized.

According to the present invention the driver and driven plates are mounted between a clutch cover and the flywheel of the car's engine. Separation between cover and flywheel is maintained by a series of radially distributed blocks bolted between them. The driver plates contain apertures on their outer peripheries to accommodate the blocks; the driver plates thus have axial freedom when the clutch is disengaged because they can slide axially along these blocks. The driven plates contain a central hole with slots formed at even intervals around the periphery of the hole. A splined, light-metal hub containing fingers which fit the slots serves to couple the driven plates to the output shaft. The number of slots in the carbon driven plates can be chosen to vary the area of contact with the hub and thus control the compressional load. The driven plates can "float" when the clutch is disengaged on the hub fingers and as a result of the hub's movement on the spline.

Another feature of the present invention is the reduction of the temperature gradient between the driven carbon disk and the output shaft. The metal hub serves as a heat sink between the carbon and the steel output shaft. Expansion differences between the carbon of the driven plates and the metal of the hub fingers and however not important because of the non-rigid attachment.

One embodiment of the invention will be described to illustrate the general principles with respect to the following drawings.

DESCRIPTION OF THE INVENTION

Figure 1:
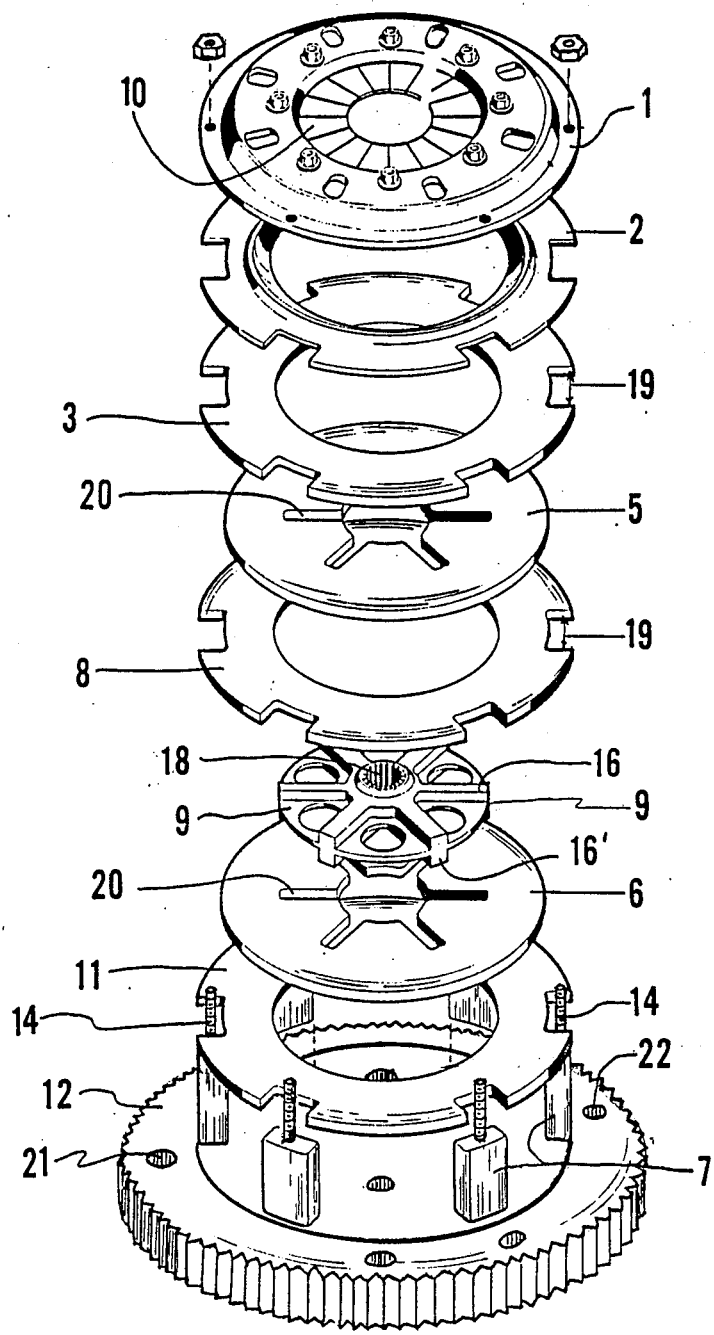
FIG. 1 is an expanded, isometric view of a clutch employing the invention.

With reference now to FIG. 1, the components of the clutch consist of a clutch cover 1 bolted to a diaphragm spring 10, pressure disk 2, carbon driver disks 3,8 and 11, carbon driven disk 5 and 6, coupling hub 9 and the spacing blocks 7. The clutch is assembled by stacking the components onto the flywheel 12 and bolting them in place with the through bolts 14. The peripheral apertures 19 in the driver disks permit the latter to move axially along the blocks when the clutch is disengaged. The diaphragm spring 10, bearing against the pressure disk 2, causes the alternately positioned driver and driven plates to come into frictionally-maintained contact. The coupling hub 9 which is a key component of the invention is formed with the fingers 16 and 16' to fit slots 20 in the driven plates 5 and 6. The hub center 18 is splined.

Figure 2:
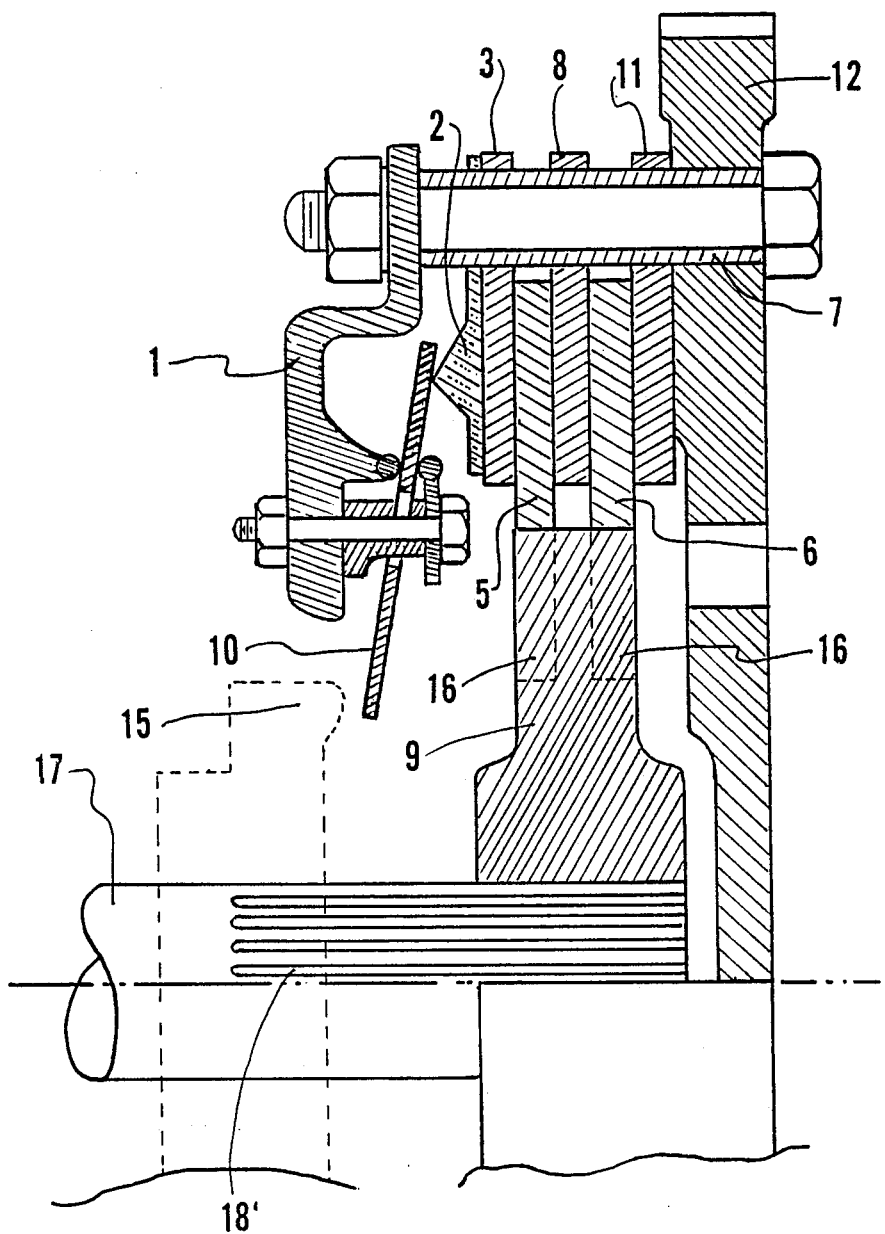
FIG. 2 is a cross section of the clutch of FIG. 1 after assembly.

The relation of the assembled parts in cross section can be seen in FIG. 2. In the position shown the clutch is engaged; the flywheel 12 is driving the output shaft 17. Engagement of the diaphragm spring 10 by a throw-out bushing 15 relieves the pressure disk 2; this causes the driver disks 3,8 and 11 to loosen their contact with the driven disks 5 and 6. The driver disk 3 moves to the left along the spacer blocks 7 leaving room for the other disks to separate. The driven disks come to a stop as does the output shaft 17.

The hub 9 acts as a load distributor and protects the carbon disks from high compression as well as coupling them to the output shaft. Because the fingers 16 and 16' are not rigidly joined to the driven disks, the differences in thermal expansion between carbon and the metal of the hub is not important.

The present invention permits the design of practical carbon to carbon clutches for racing vehicles. The flywheels and the hubs can be made of aluminum or other light metal and drilled (21 and 22 in FIG. 1). The decrease in stored kinetic energy when a 7¼ inch metallic clutch is replaced by a carbon to carbon unit of similar size is shown in the following table:

| Flywheel RPM | Stored Energy Metallic Disks Ft. Lbs | Stored Energy Carbon to Carbon Disks Ft. Lbs. |
| --- | --- | --- |
| 5000 | 640 | 2124 |
| 7000 | 7135 | 4162 |
| 9000 | 11,795 | 6880 |
| 11,000 | 17,619 | 10,278 |

The lightened clutch using carbon to carbon disks is of great value in automobile racing in that it permits easier braking, less sluggish gear shifting and greater rates of acceleration and deceleration.

The description given above as an example is of a two disk embodiment of the invention. The principles can of course be applied to a single or any multiple disk arrangement.

A further advantage of any carbon to carbon clutch is the lowered vibration level when the clutch is operated. Carbon to carbon frictional contact is self damping; the squeal associated with metal to metal or metal to some frictional materials is absent with this type of clutch.

In FIG. 1 there are six slots in the carbon driven plates and a hub with six fingers on each side. Many variations in the number and shape of the slots and corresponding fingers are possible within the scope of the invention.

We claim:

1. A carbon to carbon friction clutch for attachment to an engine flywheel comprised in combination of:
   a. a clutch cover;
   b. a diaphragm spring bolted to said clutch cover;
   c. drilled spacer blocks radially distributed between the clutch cover and the flywheel;
   d. bolts passing through said spacer blocks and holding the clutch cover at a fixed axial distance from the engine flywheel;
   e. a pressure disk which is moveable axially along said spacer blocks, rotates with the cover and flywheel and contacts the diaphragm spring;
   f. a first set of carbon disks which are moveable axially along said spacer blocks, rotate with the clutch cover and flywheel and are alternately spaced between and in selectively engageable contact with a second set of carbon disks, each of the second set being provided with a central aperture and a plurality of evenly spaced slots extending radially from the central aperture;
   g. central holes in the first set of carbon disks;
   h. a relatively flat, circular, metallic hub having oppositely facing end surfaces with a splined, circular opening at its center and formed with radial fingers on said end surfaces, the fingers fitting into the slots in the second set of carbon disks, the hub being of a diameter to be contained without touching within the central holes of the first set of carbon disks;
   i. a splined shaft entering the center of the clutch and engaging said hub at its spline;
   j. a throwout bushing slidable along the splined shaft to contact said diaphragm spring; whereby the diaphragm spring, acting upon said pressure disk, forces the first set of carbon disks into a frictional holding of the second set of carbon disks, which by virtue of their slots into which the fingers of said hub are engaged, transmit the turning of the flywheel to the splined shaft and axial movement of said throwout bushing against the diaphragm spring releases pressure between the first and second sets of carbon disks causing axial movement of the disks, slippage between the disks and the cessation of rotation of the hub and the shaft to which it is splined and whereby said metallic hub isolates the second set of carbon plates from shear forces which would otherwise be encountered if said second set of carbon plates were provided with splines and directly engaged to the splined shaft.

* * * * *